US010152207B2

(12) United States Patent
Luo et al.

(10) Patent No.: US 10,152,207 B2
(45) Date of Patent: Dec. 11, 2018

(54) METHOD AND DEVICE FOR CHANGING EMOTICONS IN A CHAT INTERFACE (71) Applicant: Xiaomi Inc., Beijing (CN)

(72) Inventors: Jixi Luo, Beijing (CN); Jinbin Lin, Beijing (CN); Youzhi Zhang, Beijing (CN)

(73) Assignee: Xiaomi Inc., Beijing (CN)

(*) Notice: Subject to any disclaimer, the term of this patent is extended or adjusted under 35 U.S.C. 154(b) by 267 days.

(21) Appl. No.: 15/145,979

(22) Filed: May 4, 2016

(65) Prior Publication Data
US 2017/0060354 A1 Mar. 2, 2017

(30) Foreign Application Priority Data
Aug. 26, 2015 (CN) .......................... 2015 1 0531710

(51) Int. Cl.
G06F 3/0482 (2013.01)
H04L 12/58 (2006.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC .................................................. G06F 3/04817
(Continued)

(56) References Cited

U.S. PATENT DOCUMENTS 7,147,562 B2    12/2006 Ohara et al.
8,909,513 B2*   12/2014 Leydon ................. G06F 3/0236
                                                    704/5
(Continued)

FOREIGN PATENT DOCUMENTS

CN    1464796 A    12/2003
CN    1870744 A    11/2006
(Continued)

OTHER PUBLICATIONS

Extended European Search Report of European Patent Application No. 16163346.6, from the European Patent Office, dated Jan. 23, 2017.
(Continued)

Primary Examiner — William D Titcomb
(74) Attorney, Agent, or Firm — Finnegan, Henderson, Farabow, Garrett & Dunner LLP (57) ABSTRACT A method for changing an emoticon in a chat interface is disclosed. The method may be implemented by a terminal device. The method may comprise detecting whether a message received by the terminal device contains a first changeable emoticon, checking a first emoticon-value list to determine a first value corresponding to the first changeable emoticon, if the received instant message contains the first changeable emoticon, checking a second emoticon-value list to determine a second value corresponding to a second emoticon, the second emoticon being configured to change the first changeable emoticon, adding the first value and the second value to obtain a value result, and checking the first emoticon-value list to change the first changeable emoticon to another emoticon corresponding to the value result.

12 Claims, 10 Drawing Sheets (51) Int. Cl.
*G06F 3/0481* (2013.01)
*G06F 3/0484* (2013.01)
*G06F 3/0488* (2013.01)
*H04M 1/725* (2006.01)

(52) U.S. Cl.
CPC ........ *G06F 3/04883* (2013.01); *H04L 51/046* (2013.01); *H04L 51/063* (2013.01); *H04L 51/10* (2013.01); *H04M 1/72552* (2013.01); *H04M 1/72563* (2013.01)

(58) Field of Classification Search
USPC .......................................................... 715/758
See application file for complete search history.

(56) References Cited

U.S. PATENT DOCUMENTS

| | | | |
|---|---|---|---|
| 10,003,599 B2 * | 6/2018 | Shi | H04L 63/101 |
| 2002/0184309 A1 | 12/2002 | Danker et al. | |
| 2003/0017873 A1 | 1/2003 | Ohara et al. | |
| 2006/0242593 A1 | 10/2006 | Gaebel | |
| 2006/0281064 A1 | 12/2006 | Sato et al. | |
| 2007/0054719 A1 | 3/2007 | Ohara et al. | |
| 2008/0278520 A1 | 11/2008 | Andreasson | |
| 2013/0159919 A1 * | 6/2013 | Leydon | G06F 3/0236 |
| | | | 715/780 |
| 2014/0143682 A1 | 5/2014 | Druck | |
| 2014/0156762 A1 | 6/2014 | Yuen et al. | |
| 2014/0214409 A1 * | 7/2014 | Leydon | G06F 3/0236 |
| | | | 704/9 |
| 2015/0052461 A1 * | 2/2015 | Sullivan | G06F 3/04845 |
| | | | 715/765 |
| 2015/0200881 A1 | 7/2015 | Zheng | |
| 2015/0286371 A1 * | 10/2015 | Degani | G06F 17/274 |
| | | | 705/14.64 |
| 2015/0334067 A1 * | 11/2015 | Zonka | H04L 67/36 |
| | | | 715/752 |
| 2016/0050169 A1 * | 2/2016 | Ben Atar | H04M 1/72544 |
| | | | 709/206 |
| 2016/0219006 A1 | 7/2016 | Yuen et al. | |
| 2017/0052946 A1 | 2/2017 | Gu et al. | |
| 2017/0060354 A1 * | 3/2017 | Luo | H04L 51/10 |
| 2017/0075868 A1 * | 3/2017 | Luo | G06F 17/2235 |

FOREIGN PATENT DOCUMENTS

| | | |
|---|---|---|
| CN | 101420393 A | 4/2009 |
| CN | 104063427 A | 9/2014 |
| CN | 104780093 A | 7/2015 |
| CN | 105119812 A | 12/2015 |
| KR | 10-1254719 B1 | 4/2013 |
| RU | 2009145287 A | 6/2011 |
| WO | WO 2008/135097 A1 | 11/2008 |

OTHER PUBLICATIONS

International Search Report of PCT/CN2015/097714, mailed from the State Intellectual Property Office of China dated May 18, 2016.
International Preliminary Report on Patentability issued in International Application No. PCT/CN2015/097714, dated Feb. 27, 2018.

* cited by examiner

METHOD AND DEVICE FOR CHANGING EMOTICONS IN A CHAT INTERFACE

CROSS-REFERENCE TO RELATED APPLICATIONS

This application is based upon and claims priority to Chinese Patent Application No. 201510531710.1 filed on Aug. 26, 2015, which is incorporated herein by reference in its entirety.

TECHNICAL FIELD

The present disclosure generally relates to the field of Internet and, more particularly, to a method and a device for changing an emoticon in a chat interface.

BACKGROUND

When chatting with an instant messaging tool, users can express their feelings by sending various emoticons. Usually, after a user receives an emoticon from another person, the emoticon will be directly displayed on a chat interface of the user's messaging tool, and the user cannot change the received emoticon. The user may feel frustrated for not being able to alter the emoticons in the chat interface.

SUMMARY

One aspect of the present disclosure is directed to a method for changing an emoticon in a chat interface. The method may be implemented by a terminal device. The method may comprise detecting whether a message received by the terminal device contains a first changeable emoticon, checking a first emoticon-value list to determine a first value corresponding to the first changeable emoticon, if the received instant message contains the first changeable emoticon, checking a second emoticon-value list to determine a second value corresponding to a second emoticon, the second emoticon being configured to change the first changeable emoticon, adding the first value and the second value to obtain a value result, and checking the first emoticon-value list to change the first changeable emoticon to another emoticon corresponding to the value result.

Another aspect of the present disclosure is directed to a terminal device. The device may comprise a processor and a non-transitory computer-readable storage medium storing instructions, that when executed by the processor, cause the terminal device to detect whether a message received by the terminal device contains a first changeable emoticon, check a first emoticon-value list to determine a first value corresponding to the first changeable emoticon, if the received instant message contains the first changeable emoticon, check a second emoticon-value list to determine a second value corresponding to a second emoticon, the second emoticon being configured to change the first changeable emoticon, add the first value and the second value to obtain a value result, and check the first emoticon-value list to change the first changeable emoticon to another emoticon corresponding to the value result.

Another aspect of the present disclosure is directed to a non-transitory computer-readable storage medium storing instructions that, when executed by a processor of a terminal device, cause the terminal device to perform a method for changing an emoticon in a chat interface. The method may comprise detecting whether a message received by the terminal device contains a first changeable emoticon, checking a first emoticon-value list to determine a first value corresponding to the first changeable emoticon, if the received instant message contains the first changeable emoticon, checking a second emoticon-value list to determine a second value corresponding to a second emoticon, the second emoticon being configured to change the first changeable emoticon, adding the first value and the second value to obtain a value result, and checking the first emoticon-value list to change the first changeable emoticon to another emoticon corresponding to the value result.

It should be understood that both the foregoing general description and the following detailed description are only exemplary and explanatory and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
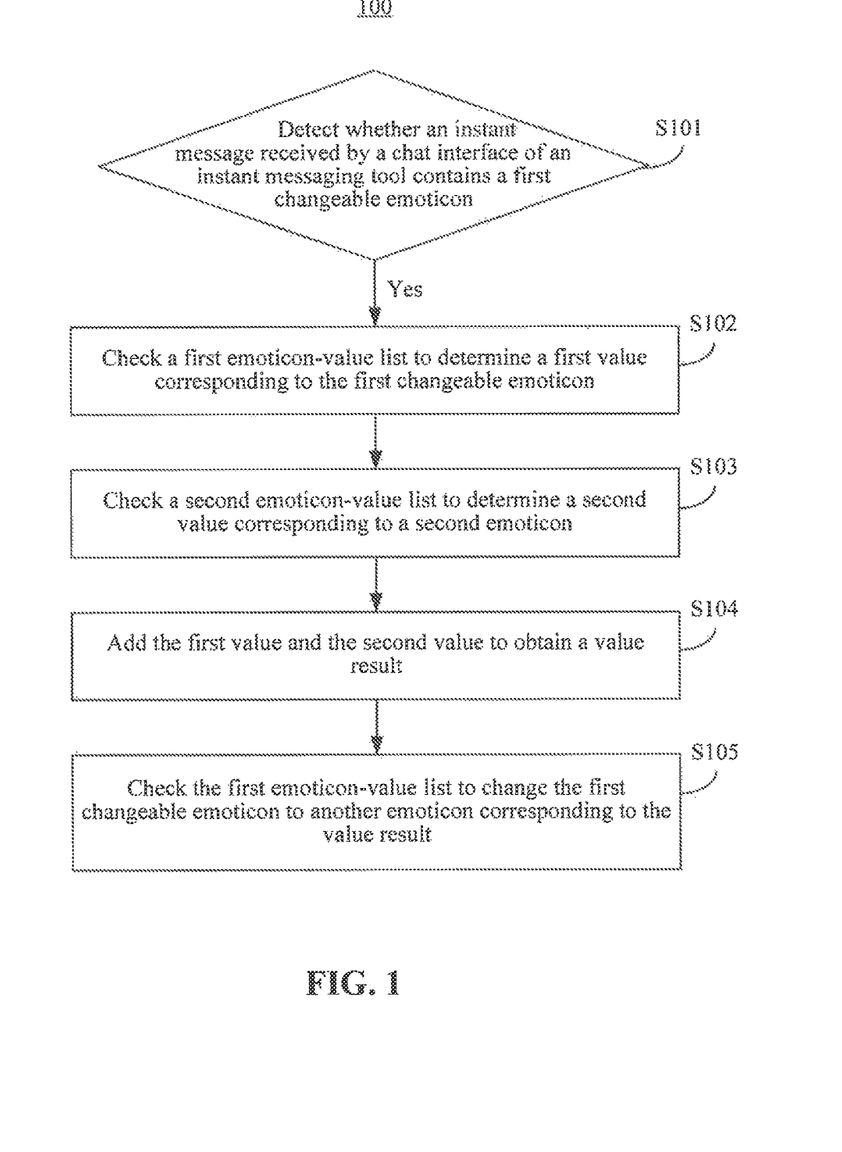
FIG. 1 is a flow chart illustrating a method for changing an emoticon in a chat interface, according to an exemplary embodiment.

FIG. 1 is a flow chart illustrating a method 100 for changing an emoticon in a chat interface, according to an exemplary embodiment. The method may be implemented by a terminal device, such as a smart phone, a tablet PC, or a desktop computer. The terminal device may include an instant messaging tool. As shown in FIG. 1, the method 100 may comprise the following steps:

Step S101 includes detecting whether an instant message received by a chat interface of an instant messaging tool contains a first changeable emoticon.

Emoticons described in this disclosure may be changeable emoticons. In some embodiments, determining whether the instant message contains at least one emoticon may be achieved by determining whether the instant message contains a character corresponding to an emoticon.

Step S102 includes checking a first emoticon-value list to determine a first value corresponding to the first changeable emoticon, if the received instant message contains the first changeable emoticon, the first emoticon value list comprising a plurality of emoticons and values corresponding to the plurality of emoticons.

In some embodiments, emoticons, e.g. changeable emoticons, may be respectively associated with values, and different emoticons may correspond to different values representing intensities of feelings. In some embodiments, different emoticons may correspond to different values. Positive values may correspond to emoticons representing positive emotions, and negative values may correspond to emoticons representing negative emotions.

For example, a value corresponding to a sad emoticon ☹ can be −2, a value corresponding to a miserable emoticon ☹ can be −4, a value corresponding to a smile emoticon ☺ can be 1, a value corresponding to an ecstatic emoticon ☺ can be 4, and the values in this group may represent intensities of feelings. If the instant message contains an emoticon, a first value of the emoticon can be determined to be a value corresponding to the emoticon. If the instant message contains two or more emoticons, a first value of the two or more emoticons can be determined to be a sum of values respectively corresponding to the two or more emoticons. In a group chat, when a user sends several emoticons with negative values, for instance, four miserable emoticons "☹ ☹ ☹ ☹", the emotion value may be −16. Another user in the group chat who wants to improve the sender's emotion can change the four miserable emoticons to four ecstatic emoticons by @ the sender's name and then inputting eight ecstatic emoticons "☺ ☺ ☺ ☺ ☺ ☺ ☺ ☺".

Step S103 includes checking a second emoticon-value list to determine a second value corresponding to a second emoticon, the second emoticon being configured to change the first changeable emoticon, and the second emoticon-value list comprising a plurality of second emoticons and values respectively corresponding to the plurality of second emoticons.

In some embodiments, both the first emoticon-value list and the second emoticon-value list may be included in the instant messaging tool and may be changeable. When a user needs to modify values in the first emoticon-value list or the second emoticon-value list, the values required to be modified may be written to the first or the second emoticon-value list.

Step S104, adding the first value and the second value to obtain a value result.

Step S105, checking the first emoticon-value list to change the first changeable emoticon to another emoticon corresponding to the value result.

In some embodiments, emoticons input into an input box may be detected to determine corresponding values, a second total value of the emoticons may be calculated, and a value result may be determined based on the first value and the second value. Thus, how to change at least one emoticon in the instant message according to the value result can be determined. In some embodiments, an emoticon corresponding to the value result can be set by a user. For example, an emoticon may correspond to different configurations of a hollow heart depending on the value result, and as the value becomes larger, the more the hollow heart may be filled. For another example, the value result may correspond to a combination of positive emotions, or the like.

In some embodiments, when the instant message received by the chat interface of the instant messaging tool contains a changeable first emoticon, a first value corresponding to the first emoticon and a second value corresponding to a second emoticon configured to change the first emoticon can be determined to change the first emoticon to another emoticon corresponding to the value result. Thus, the emoticons of instant chat can have value results representing feelings, and the received emoticons may be dynamically changed according to the value results. As the users receive the dynamically changed emoticons, the instant chat can become more interesting.

In some embodiments, determining a first value corresponding to a first emoticon if an instant message contains the first emoticon may comprise: determining values respectively corresponding to a plurality of emoticons according to a first emoticon-value list; and adding the values corresponding to obtain a first value.

In some embodiments, the method may further comprise: detecting whether a new emoticon exists in an emoticon library of the instant messaging tool; determining a value corresponding to the new emoticon if the new emoticon exists in the emoticon library; and updating the first emoticon-value list to include the new emoticon and the value corresponding to the new emoticon.

In some embodiments, the second emoticon-value list may be the same as or different from the first emoticon-value list.

Subsequent embodiments may describe changing an emoticon in a chat interface.

As described, emoticons may have value results corresponding to feelings during an instant chat, and the emoticons may be dynamically changed according to the value results, so that a user may receive the dynamically changed emoticons, and the instant chat may be more interesting.

Figure 2A:
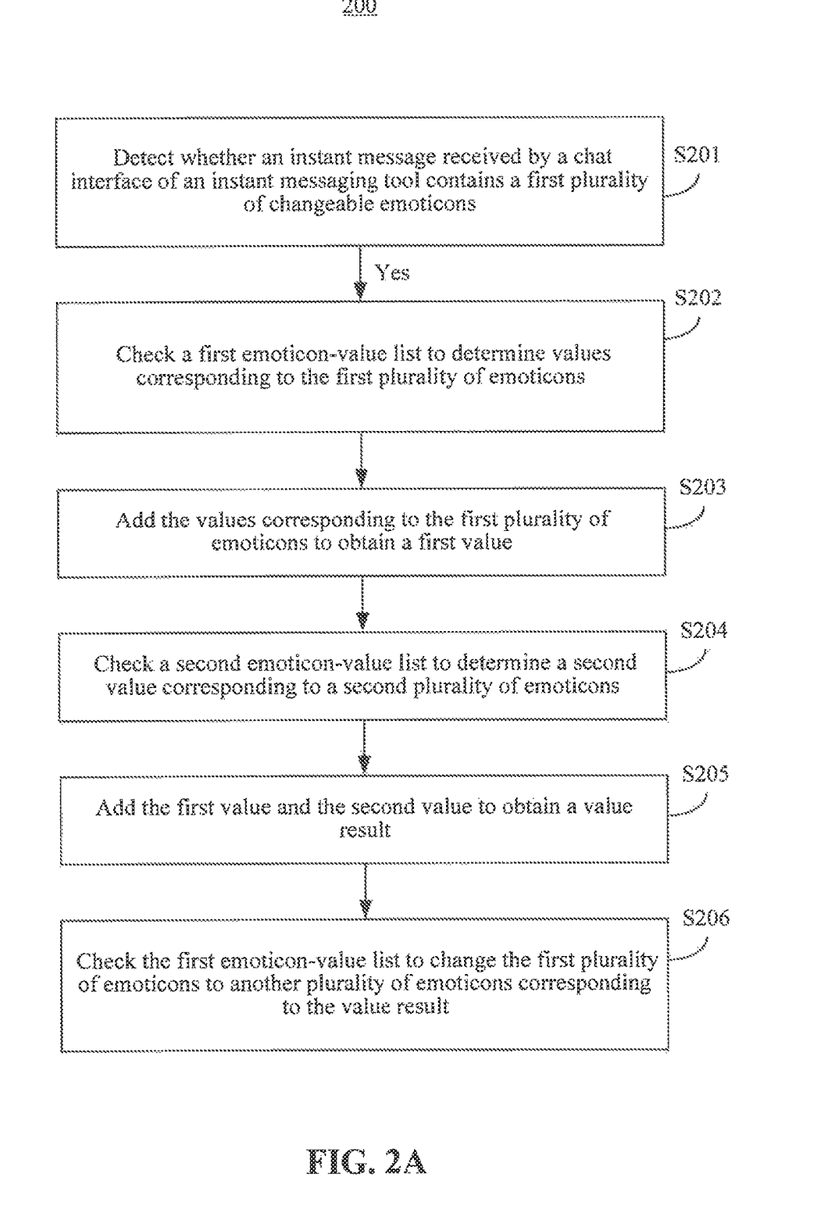
FIG. 2A is a flow chart illustrating a method for changing an emoticon in a chat interface, according to a first exemplary embodiment.
Figure 2B:
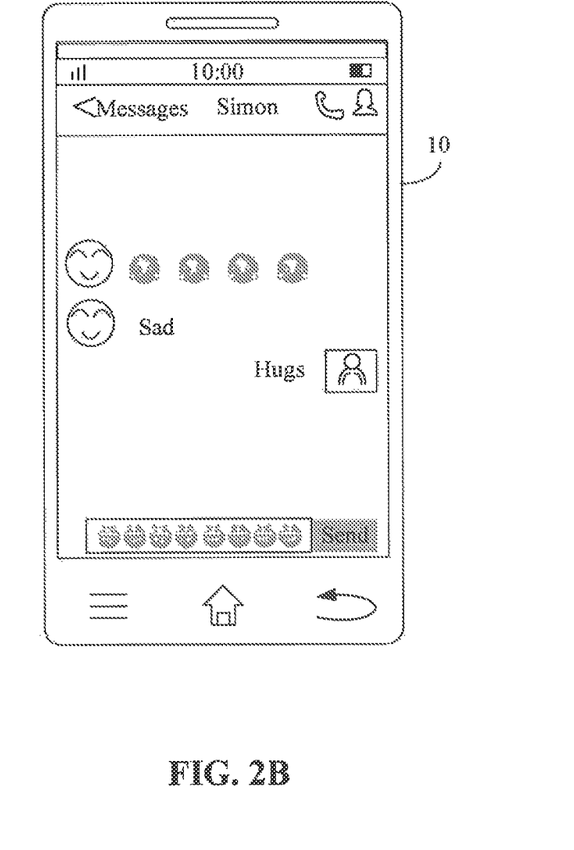
FIG. 2B is a graphical illustration of a method for changing an emoticon in a chat interface, according to the first exemplary embodiment.
Figure 2C:
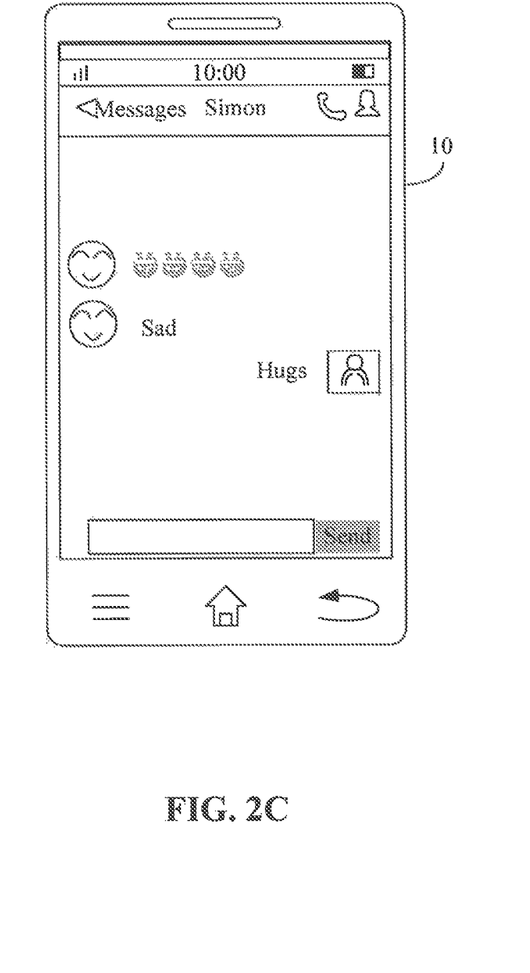
FIG. 2C is a graphical illustration of a method for changing an emoticon in a chat interface, according to the first exemplary embodiment.
Figure 2D:
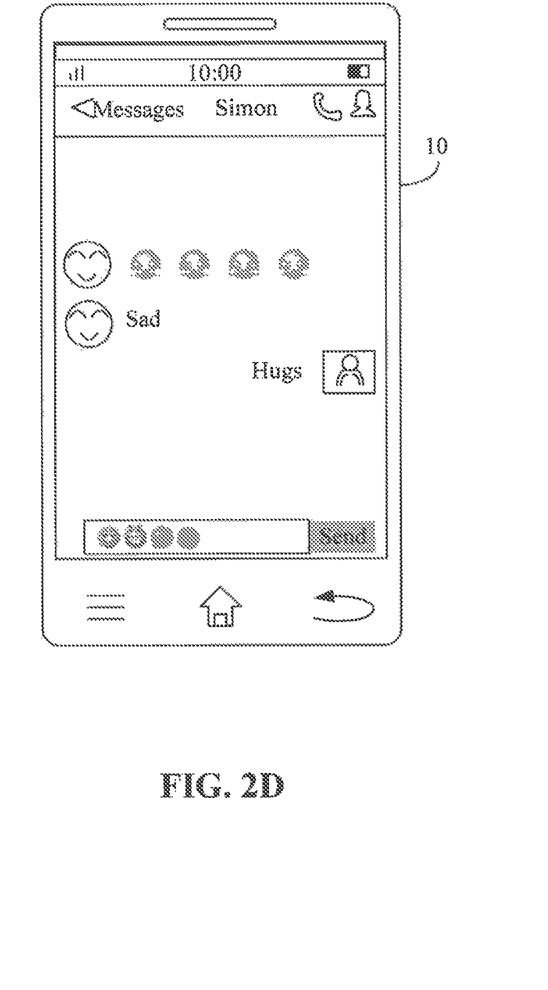
FIG. 2D is a graphical illustration of a method for changing an emoticon in a chat interface, according to the first exemplary embodiment.
Figure 2E:
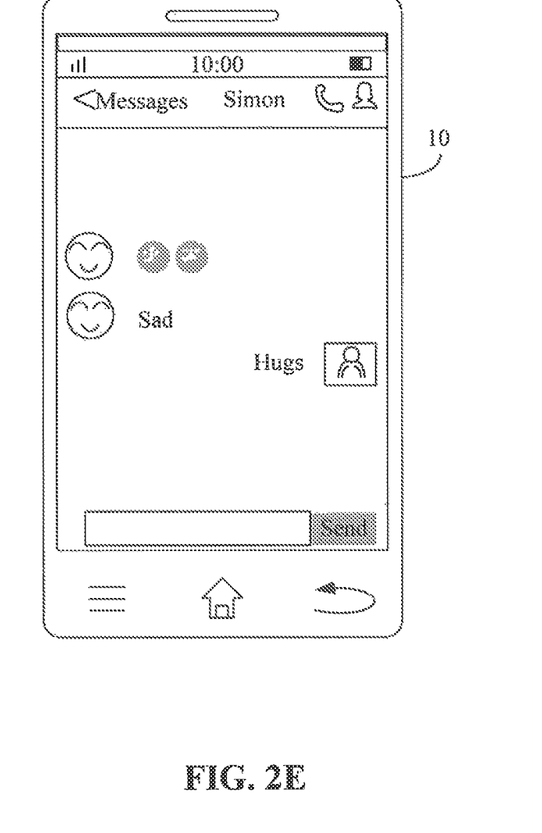
FIG. 2E is a graphical illustration of a method for changing an emoticon in a chat interface, according to the first exemplary embodiment.

FIG. 2A is a flow chart illustrating a method 200 for changing an emoticon in a chat interface, according to a first exemplary embodiment. FIG. 2B is a first graphical illustration of a method for changing an emoticon in a chat interface, according to the first exemplary embodiment. FIG. 2C is a second graphical illustration of a method for changing an emoticon in a chat interface, according to the first exemplary embodiment. FIG. 2D is a third graphical illustration of a method for changing an emoticon in a chat interface, according to the first exemplary embodiment. FIG. 2E is a fourth graphical illustration of a method for changing an emoticon in a chat interface, according to the first exemplary embodiment. As shown in FIG. 2A, the method 200 may comprise the following steps:

Step S201 may include detecting whether an instant message received by a chat interface of an instant messaging tool contains a first plurality of changeable emoticons.

The step S201 may be similar to the step S101, and will not be elaborated here.

Step S202 may include checking a first emoticon-value list to determine values corresponding to the first plurality of emoticons, if the instant message contains the first plurality of emoticons, the first emoticon-value list comprising the first plurality of emoticons and values corresponding to the first plurality of emoticons.

Step S203 may include adding the values corresponding to the first plurality of emoticons to obtain a first value.

Step S204 may include checking a second emoticon-value list to determine a second value corresponding to a second emoticon, the second emoticon being configured to change the first emoticon, and the second emoticon-value list comprising a plurality of second emoticons and values corresponding to the plurality of second emoticons.

In some embodiments, the second emoticon-value list may be the same as or different from the first emoticon-value list. If the second emoticon-value list is the same as the first emoticon-value list, the values of the emoticons may be more unified, and if the second emoticon-value list is different from the first emoticon-value list, the values of the emoticons may be more diverse.

Step S205 may include adding the first value and the second value to obtain a value result.

Step S206 may include checking the first emoticon-value list to change the first plurality of emoticons to another plurality of emoticons corresponding to the value result.

In one example, if an instant message received by a terminal device from a communication contains four crying emoticons, and a value corresponding to each crying emoticon is −4, a first value of the instant message is −16. A second emoticon-value list is checked to determine a second value corresponding to a second emoticon, so that the terminal device can prompt the user whether to change the emoticons. If yes, as shown in FIG. 2B, the terminal device user may input eight ecstatic emoticons into the input box. Since a second value corresponding to the eight ecstatic emoticons is 32, and 32−16=16, the four emoticons are changed to an emoticon or emoticons corresponding to a value result of 16. In some embodiments, an emoticon or emoticons corresponding to a value result may be a preset icon combination, or a preset icon. For instance, as the value result 16 divided by 4 equals to 4, the four crying emoticons (each having a value of −4) may be changed to four ecstatic emoticons (each having a value of 4), as shown in FIG. 2C. In some embodiments, as shown in FIG. 2D, after a terminal device user inputs a smile emoticon (with a corresponding value of 1), an ecstatic emoticon (with a corresponding value of 4), a tittering emoticon (with a corresponding value of 3), and a giggle emoticon (with a corresponding value of 2) in the input box, a second value of the four emoticons is calculated to be 1+4+3+2=10, and the value result is 10−16=−6. A new value result −6 divided by 4 equals to −1.5, and correspondingly the cry emoticons may be changed to a pouting emoticon, which can be −0.5, and a sad emoticon, which can be −1, as shown in FIG. 2E, since −1.5 is smaller than 0.

In some embodiments, if it is determined that the terminal device user is in a group chat, a sender corresponding to the emoticons required to be changed in a group chat can be determined, for example, by selecting (@) the sender's name, determining a second value of the emoticons input into the input box by the sender, and determining at least one emoticon sent by the sender to be changed according to the first value and the second value.

As described, at least one of the values respectively corresponding to the first plurality of emoticons can be determined according to the first emoticon-value list, so that at least one of the first plurality of emoticons can be changed based on the values, thereby improving the changing diversity of the emoticons in the chat interface to make the instant chat more interesting.

Figure 3:
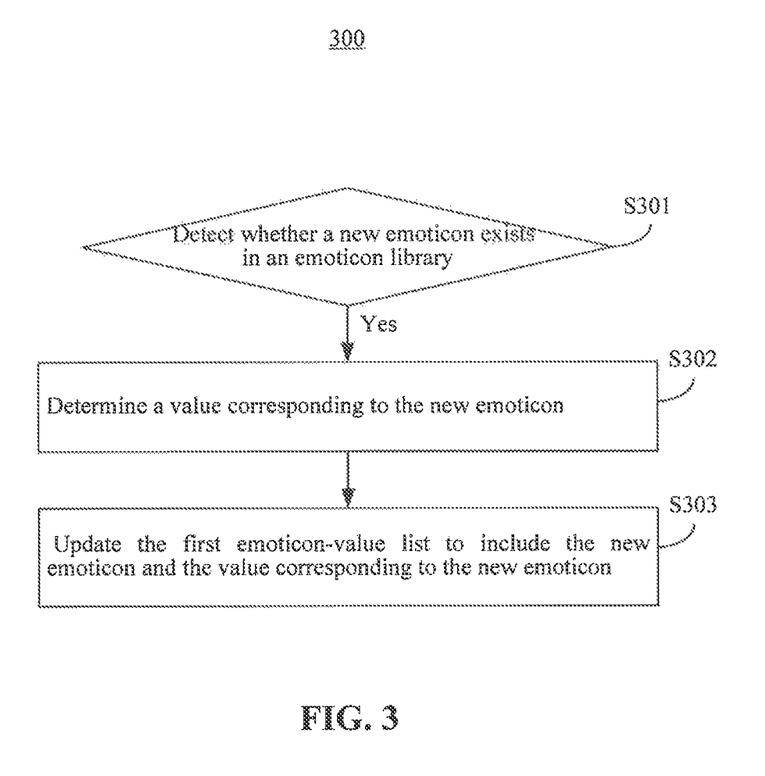
FIG. 3 is a flow chart illustrating a method for changing an emoticon in a chat interface, according to a second exemplary embodiment.

FIG. 3 is a flow chart illustrating a method 300 for changing an emoticon in a chat interface, according to a second exemplary embodiment. As shown in FIG. 3, the method 300 may comprise the following steps:

Step S301 may include detecting whether a new emoticon exists in an emoticon library of an instant messaging tool.

In some embodiments, a terminal device user can store a received emoticon sent by a communication peer device to a memory module of the instant messaging tool, to use the received emoticon as a new emoticon, such as a picture from "Demoncrab-Tuzi" series. After receiving the picture from "Demoncrab-Tuzi" series, the user may store the picture into the memory module of the instant messaging tool to form the new emoticon described above.

Step S302 may include determining a value corresponding to the new emoticon, if it is detected that the new emoticon exists in the emoticon library.

In some embodiments, setting the value corresponding to the new emoticon may be customized by a user according to the feeling represented by the emoticon.

Step S303 may include updating the first emoticon-value list to include the new emoticon and a value corresponding to the new emoticon.

As described, a quantization range of the emoticons can be extended by adding new emoticons and values corresponding to the emoticons into the emoticon-value list, so that the emoticons in the instant chat are more diverse.

Figure 4:
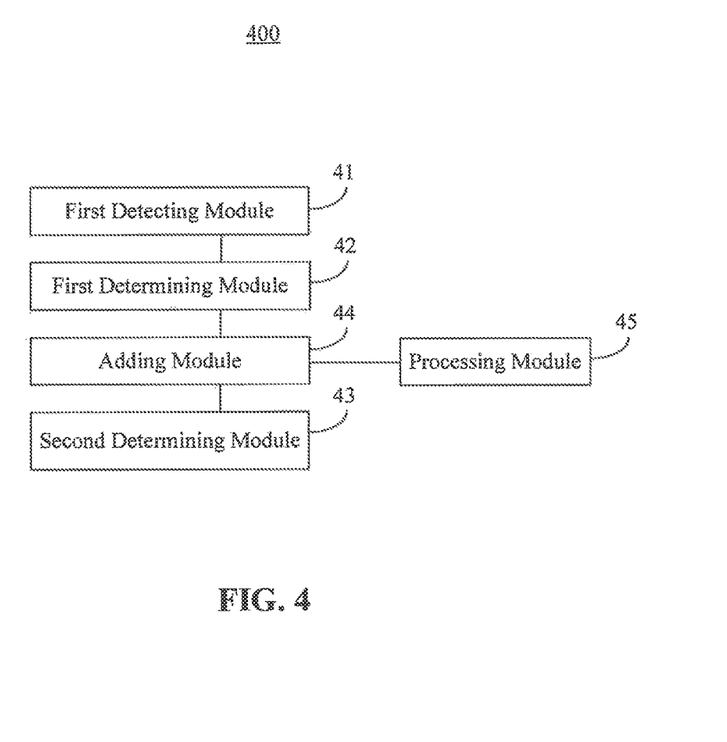
FIG. 4 is a block diagram of a device for changing an emoticon in a chat interface, according to an exemplary embodiment.

FIG. 4 is a block diagram of a device 400 for changing an emoticon in a chat interface, according to an exemplary embodiment. The device 400 may be a part of a terminal device installed with an instant messaging tool. As shown in FIG. 4, the device 400 may comprise: a first detecting module 41, a first determining module 42, a second determining module 43, an adding module 44, and a processing module 45.

The first detecting module 41 is configured to detect whether an instant message received by a chat interface of the instant messaging tool contains a first changeable emoticon, The first determining module 42 is configured to check a first emoticon-value list to determine a first value corresponding to the first emoticon, if the first detecting module 41 detects that the received instant message contains the first emoticon, the first emoticon-value list comprising a plurality of emoticons and values corresponding to the plurality of emoticons, The second determining module 43 is configured to check a second emoticon-value list to determine a second value corresponding to a second emoticon, the second emoticon being configured to change the first emoticon, and the second emoticon-value list comprising a plurality of second emoticons and values corresponding to the plurality of second emoticons, The adding module 44 is configured to add the first value determined by the first determining module 42 and the second value determined by the second determining module 43 to obtain a value result, and The processing module 45 is configured to check the first emoticon-value list to change the first emoticon to another emoticon corresponding to the value result obtained by the adding module 44.

Figure 5:
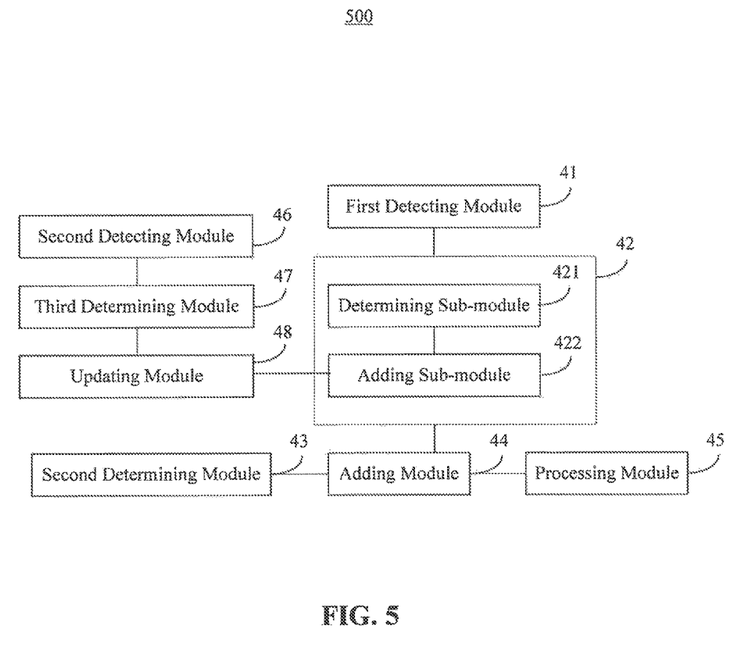
FIG. 5 is a block diagram of a device for changing an emoticon in a chat interface, according to an exemplary embodiment.

FIG. 5 is a block diagram of a device 500 for changing an emoticon in a chat interface, according to an exemplary embodiment. The device 500 may include components similar to those in the device 400. As shown in FIG. 5, the first determining module 42 may comprise: a determining sub-module 421 configured to determine values respectively corresponding to emoticons received by a chat interface of an instant messaging tool according to the first emoticon-value list; and an adding sub-module 422 configured to add the values determined by the determining sub-module 421 and corresponding to the emoticons to obtain a first value.

In some embodiments, the device 500 may further comprise: a second detecting module 46 configured to detect whether a new emoticon exists in an emoticon library of the instant messaging tool, a third determining module 47 configured to determine a value corresponding to the new emoticon, if the second detecting module 46 detects that the new emoticon exists in the emoticon library, and an updating module 48 configured to update the first emoticon-value list to include the new emoticon determined by the third determining module 47 and a value corresponding to the new emoticon, so that the first determining module 42 can check from an updated first emoticon-value list.

Figure 6:
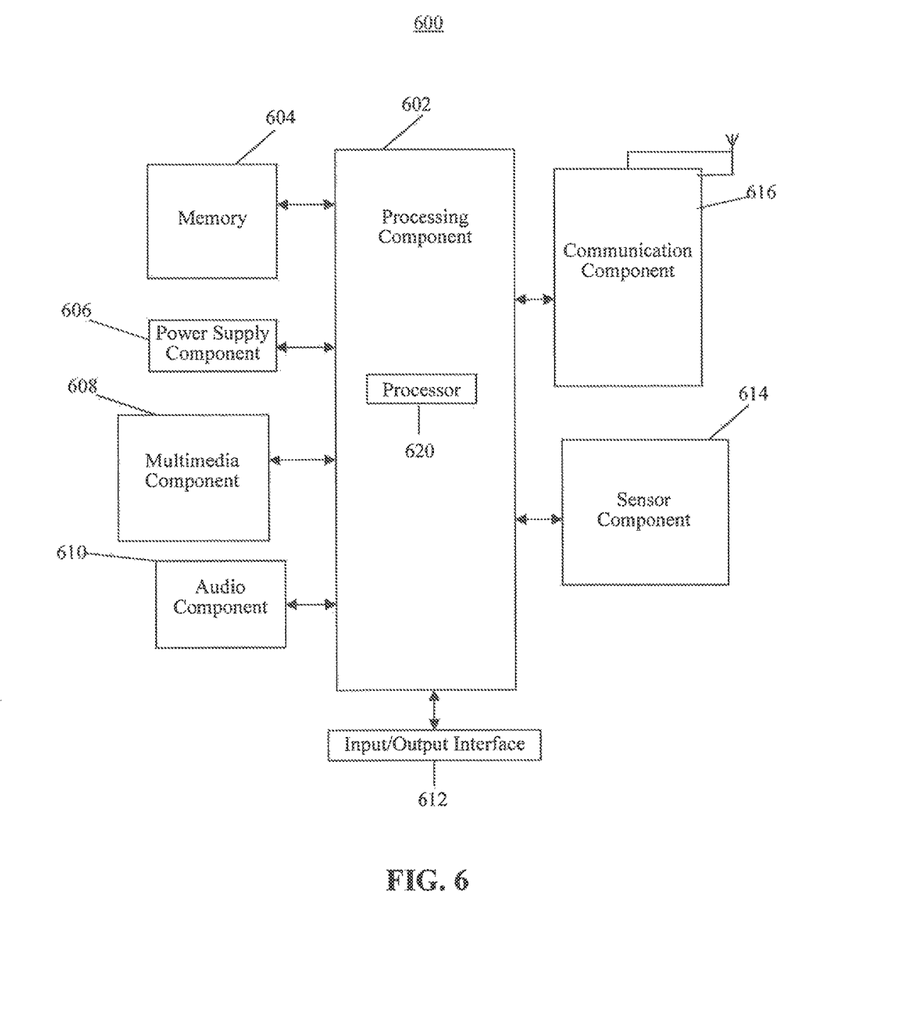
FIG. 6 is a block diagram of a device for changing an emoticon in a chat interface, according to an exemplary embodiment.

FIG. 6 is a block diagram of a device 600 for changing an emoticon in a chat interface, according to an exemplary embodiment. Fox example, the device 600 may be a mobile phone, a computer, a digital broadcast terminal, a message transceiver, a game console, a tablet device, a medical device, fitness equipment, a personal digital assistant, or the like.

Referring to FIG. 6, the device 600 may include one or more following components: a processing component 602, a memory 604, a power supply component 606, a multimedia component 608, an audio component 610, an input/output (I/O) interface 612, a sensor component 614, and a communication component 616.

The processing component 602 may control overall operations of the device 600, such as the operations associated with display, telephone calls, data communications, camera operations and recording operations. The processing component 602 may include one or more processors 620 to execute instructions to perform all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 may be configured to store various types of data to support the operation of the device 600. Examples of such data include instructions for any applications or methods operated on the device 600, contact data, phonebook data, messages, pictures, video, etc. The memory 604 may be any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 606 may provide power to various components of the device 600. The power supply component 606 may include a power supply management system, one or more power sources, and any other components associated with the generation, management, and distribution of power in the device 600.

The multimedia component 608 may include a screen providing an output interface between the device 600 and the user. In some embodiments, the screen may include a liquid crystal display (LCD) and a touch panel (TP). If the screen may include the touch panel, the screen may be implemented as a touch screen to receive input signals from the user. The touch panel may include one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 608 may include a front camera and/or a rear camera. The front camera and/or the rear camera may receive an external multimedia datum while the device 600 is in an operation mode, such as a photographing mode or a video mode. Each of the front and rear cameras may be a fixed optical lens system or have a focus and optical zoom capability.

The audio component 610 may be configured to output and/or input audio signals. For example, the audio component 610 may include a microphone (MIC) configured to receive an external audio signal, when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 may include one or more sensors to provide status assessments of various aspects of the device 600. For instance, the sensor component 614 may detect an open/closed status of the device 600, relative positioning of components, e.g., the display and the keypad, of the device 600, a change in position of the device 600, or a component of the device 600, a presence or absence of user's contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 may be configured to facilitate communication, wired or wirelessly, between the device 600 and other devices. The device 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium comprising instructions, such as comprised in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A processor-implemented method for changing an emoticon in a chat interface of an instant messaging application installed on a terminal device, the method comprising:
    detecting whether a message received by the instant messaging application contains a first changeable emoticon;
    checking a first emoticon-value list to determine a first value corresponding to the first changeable emoticon, if the received instant message contains the first changeable emoticon;
    receiving a second emotion from an input box of the chat interface;
    checking a second emoticon-value list to determine a second value corresponding to the second emoticon, the second emoticon being configured to change the first changeable emoticon;
    adding the first value and the second value to obtain a value result; and
    checking the first emoticon-value list to automatically change the first changeable emoticon in the message to another emoticon corresponding to the value result.

2. The method of claim 1, wherein determining the first value corresponding to the first changeable emoticon, if the instant message contains at least one first emoticon comprises:
    determining values respectively corresponding to a plurality of changeable emoticons according to the first emoticon-value list; and
    adding the values to obtain the first value.

3. The method of claim 2, wherein the method further comprises:
    detecting whether a new emoticon exists in an emoticon library of the terminal device;
    determining a value corresponding to the new emoticon, if the new emoticon exists in the emoticon library; and
    updating the first emoticon-value list to include the new emoticon and the value corresponding to the new emoticon.

4. The method of claim 1, wherein the second emoticon-value list is the same as the first emoticon-value list.

5. A terminal device, comprising:
    a processor; and
    a non-transitory computer-readable storage medium storing instructions, that when executed by the processor, cause the terminal device to:
        detect whether a message received by an instant messaging application installed on the terminal device contains a first changeable emoticon;
        check a first emoticon-value list to determine a first value corresponding to the first changeable emoticon, if the received instant message contains the first changeable emoticon;
        receive a second emotion from an input box of a chat interface of the instant messaging application;
        check a second emoticon-value list to determine a second value corresponding to the second emoticon, the second emoticon being configured to change the first changeable emoticon;
        add the first value and the second value to obtain a value result; and
        check the first emoticon-value list to automatically change the first changeable emoticon in the message to another emoticon corresponding to the value result.

6. The terminal device according to claim 5, wherein the processor is further configured to:
    determine values respectively corresponding to a plurality of changeable emoticons according to the first emoticon-value list; and
    add the values to obtain the first value.

7. The terminal device according to claim 6, wherein the processor is further configured to:
    detect whether a new emoticon exists in an emoticon library of the terminal device;
    determine a value corresponding to the new emoticon, if the new emoticon exists in the emoticon library; and
    update the first emoticon-value list to include the new emoticon and the value corresponding to the new emoticon.

8. The terminal device according to claim 5, wherein the second emoticon-value list is the same as the first emoticon-value list.

9. A non-transitory computer-readable storage medium storing instructions that, when executed by a processor of a terminal device, cause the terminal device to perform a method for changing an emoticon in a chat interface of an instant messaging application installed on the terminal device, the method comprising:
    detecting whether a message received by the instant messaging application contains a first changeable emoticon;
    checking a first emoticon-value list to determine a first value corresponding to the first changeable emoticon, if the received instant message contains the first changeable emoticon;
    receiving a second emotion from an input box of the chat interface;

checking a second emoticon-value list to determine a second value corresponding to the second emoticon, the second emoticon being configured to change the first changeable emoticon;

adding the first value and the second value to obtain a value result; and checking the first emoticon-value list to automatically change the first changeable emoticon in the message to another emoticon corresponding to the value result.

10. The storage medium according to claim 9, wherein the method further comprises:

determining values respectively corresponding to a plurality of changeable emoticons according to the first emoticon-value list; and adding the values to obtain the first value.

11. The storage medium according to claim 9, wherein the method further comprises:

detecting whether a new emoticon exists in an emoticon library of the terminal device;

determining a value corresponding to the new emoticon, if the new emoticon exists in the emoticon library; and updating the first emoticon-value list to include the new emoticon and the value corresponding to the new emoticon.

12. The storage medium according to claim 9, wherein the second emoticon-value list is the same as the first emoticon-value list.

* * * * *